(12) United States Patent
Korpusik et al.

(10) Patent No.: US 10,453,099 B2
(45) Date of Patent: Oct. 22, 2019

(54) BEHAVIOR PREDICTION ON SOCIAL MEDIA USING NEURAL NETWORKS

(71) Applicant: FUJI XEROX CO., LTD., Tokyo (JP)

(72) Inventors: Mandy Barrett Korpusik, Cambridge, MA (US); Francine Chen, Menlo Park, CA (US); Shigeyuki Sakaki, Kanagawa (JP); Yin-Ying Chen, Sunnyvale, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 653 days.

(21) Appl. No.: 14/966,438

(22) Filed: Dec. 11, 2015

(65) Prior Publication Data

US 2017/0169475 A1 Jun. 15, 2017

(51) Int. Cl.
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2006/0015404 A1* | 1/2006 | Tran | ............ | G06Q 30/0224 705/14.25 |
| 2010/0119053 A1* | 5/2010 | Goeldi | ............ | G06Q 10/00 379/265.09 |
| 2012/0166267 A1* | 6/2012 | Beatty | ............ | G06Q 30/0247 705/14.21 |
| 2014/0244361 A1* | 8/2014 | Zhang | ............ | G06Q 30/0204 705/7.33 |
| 2015/0127327 A1* | 5/2015 | Bacchiani | ............ | G10L 25/30 704/202 |

(Continued)

OTHER PUBLICATIONS

Amiri, H., et al., Target-Dependent Churn Classification in Microblogs, Computational Linguistics and Information Processing (CLIP) Lab, Institute for Advanced Computer Studies, University of Maryland. 2015, 7 pgs, URL: http://www.umiacs.umd.edu/~hadi/chData/churn-aaai15.pdf.

(Continued)

*Primary Examiner* — William A Brandenburg
(74) *Attorney, Agent, or Firm* — Procopio, Cory, Hargreaves & Savitch LLP

(57) ABSTRACT

Example implementations include a system and method of recognizing behavior of a user. In example implementations, a first post and at least one subsequent post indicative of a product and associated with a first social media account is obtained. A relevance probability is calculated for each of the obtained first post and the at least one subsequent post. The obtained first post and the at least one subsequent post are sequentially analyzed by a second neural network to determine output values relevant to probability of purchasing the product. A probability of purchasing the product is calculated based on the determined output values associated with each post and the calculated relevance probabilities. Product-related information is transmitted to the user associated with the obtained first post based on the determined probability of purchasing the product.

20 Claims, 9 Drawing Sheets

(56) References Cited

U.S. PATENT DOCUMENTS

2016/0012511 A1* 1/2016 Braziunas ............. G06F 16/278
705/14.53
2016/0267377 A1* 9/2016 Pan ..................... G06F 17/2785

OTHER PUBLICATIONS

Graves, A., et al., Speech Recognition with Deep Recurrent Neural Networks, Department of Computer Science, University of Toronto, 2013, 5 pgs, URL: http://www.cs.toronto.edu/~fritz/absps/RNN13.pdf.

Kalchbrenner, N., et al., Recurrent Convoluntional Neural Networks for Discourse Compositionality, Jun. 15, 2013, Department of Computer Science, Oxford University, 8 pgs, URL: http://arxiv.org/pdf/1306.3584.pdf.

Mikolov, T., et al., Distributed Representations of Words and Phrases and their Compositionality, 2013, 9 pgs, URL: http://papers.nips.cc/paper/5021-distributed-representations-of-words-and-phrases-and-their-compositionafity.pdf.

Zhang, Y., et al., Predicting Purchase Behaviors from Social Media, International World Wide Web Conference Committee, (IW3C2), May 13-17, 2013, Rio de Janeiro, Brazil, 11 pgs, URL: http://www2013.wwwconference.org/proceedings/p1521.pdf.

\* cited by examiner

US 10,453,099 B2

BEHAVIOR PREDICTION ON SOCIAL MEDIA USING NEURAL NETWORKS

BACKGROUND

Field

The present disclosure relates to social media networks, and more specifically, to systems and methods of using social media networks to predict behavior.

Related Art

In related art social media, important aspects of customer relationship management (CRM) may include interacting with and responding to individual customers, as well as analyzing social media data for trends and business intelligence. Further, consumers often seek information or ask for input from friends and family before buying certain products, such as cameras, mobile phones, or cars. Social media users may use social media to obtain this input from friends and family. Thus, social media may provide cues to identify users likely to purchase a product. By identifying likely purchasers, as opposed to simply targeting anyone who mentions a product, advertisements and product information can be shown to a more select set of users.

However, social media posts can cover a variety of genres, including informative, topical, emotional, or trivial. Thus, a user's posts mentioning a product may not be relevant, or indicative of whether a user is likely to purchase a product. Related art approaches may not determine relevance of social media posts.

SUMMARY OF THE DISCLOSURE

Aspects of the present disclosure include a method of recognizing a behavior of a user. The method can include obtaining a first post and at least one subsequent post indicative of a product and associated with a first social media account; calculating, using a first neural network, a relevance probability for each of the obtained first post and the at least one subsequent post; determining, using a second neural network, an output value relevant to probability of purchasing associated with each post by sequentially analyzing each post; calculating a probability of purchasing the product based on the determined output values associated with each post and the calculated relevance probabilities; and transmitting product-related information to the user associated with the obtained first post based on the determined probability of purchasing the product.

Additional aspects of the present disclosure include a non-transitory computer readable medium having stored therein a program for making a computer execute a method of recognizing behavior of a user. The method can include obtaining a first post and at least one subsequent post indicative of a product and associated with a first social media account; calculating, using a first neural network, a relevance for each of the obtained first post and the at least one subsequent post; determining, using a second neural network, an output value relevant to probability of purchasing associated with each post by sequentially analyzing each post; calculating a probability of purchasing the product based on the determined output values associated with each post and the calculated relevance probabilities; and transmitting product-related information to the user associated with the obtained first post based on the determined probability of purchasing the product.

Additional aspects of the present disclosure also include an apparatus configured to recognize behavior of a user. The apparatus can include a memory, and a processor configured. The processor can be configured to obtain a first post and at least one subsequent post indicative of a product and associated with a first social media account; calculate, using a first neural network, a relevance probability for each of the obtained first post and the at least one subsequent post; determine, using a second neural network, an output value relevant to probability of purchasing associated with each post by sequentially analyzing each post; calculate a probability of purchasing the product based on the determined output values associated with each post and the calculated relevance probabilities; and transmit product-related information to the user associated with the obtained first post based on the determined probability of purchasing the product.

Additional aspects of the present disclosure also include another apparatus configured to recognize behavior of a user. The apparatus can include means for obtaining a first post and at least one subsequent post indicative of a product and associated with a first social media account; means for calculating, using a first neural network, a relevance probability for each of the obtained first post and the at least one subsequent post; means for determining, using a second neural network, an output value relevant to probability of purchasing associated with each post by sequentially analyzing each post; means for calculating a probability of purchasing the product based on the determined output values associated with each post and the calculated relevant probabilities; and means for transmitting product-related information to the user associated with the obtained first post based on the determined probability of purchasing the product.

DETAILED DESCRIPTION

Figure 1:
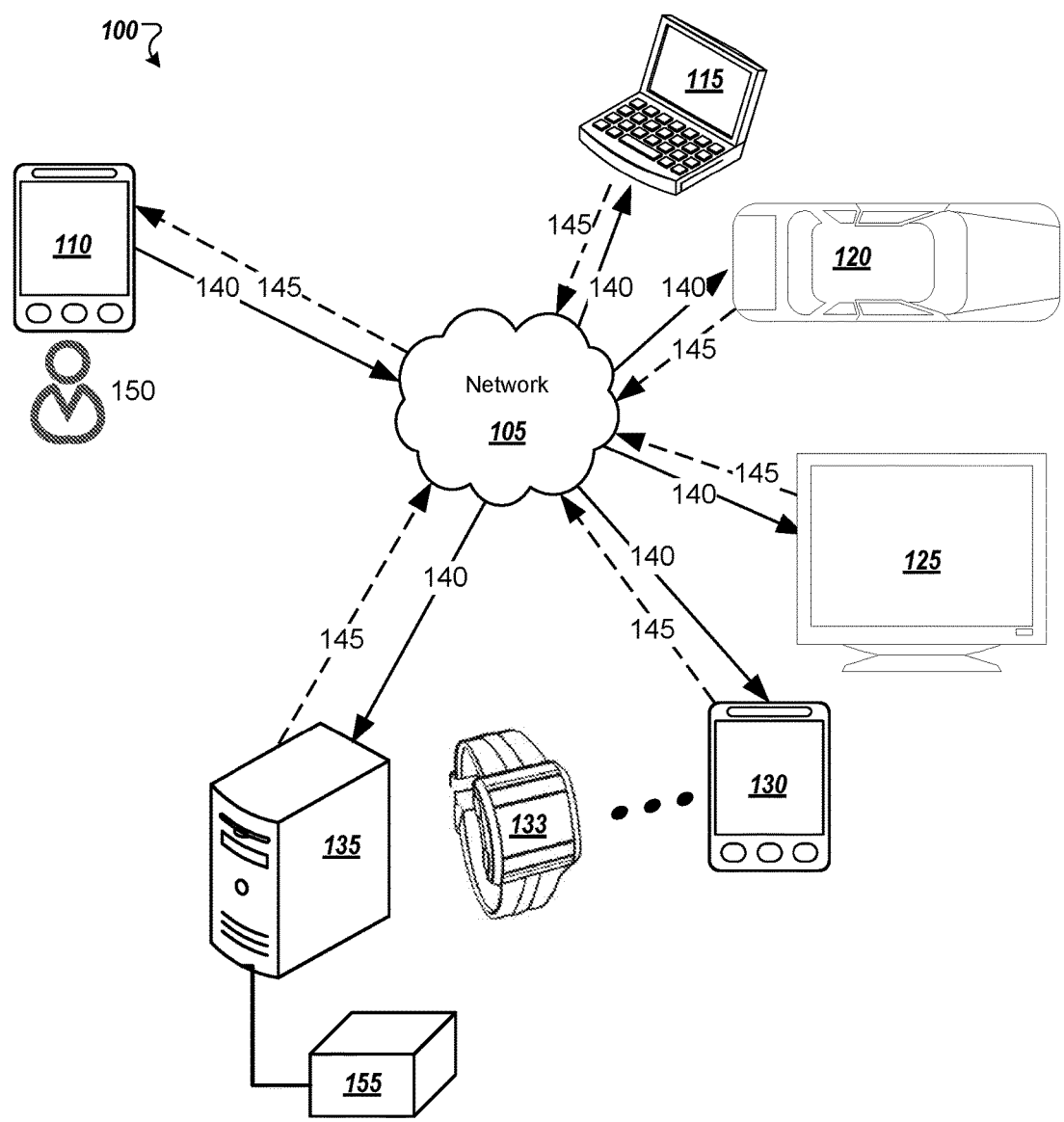
FIG. 1 illustrates a social media environment usable with example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

FIG. 1 illustrates a social media environment 100 usable with example implementations of the present application. In some example implementations, the social media environment may be a microblog social media environment. For example, but not by way of limitation, the microblog may include TWITTER, TUMBLR, TOUT, TENCENT Weibo or any other microblogging platform that may be apparent to a person of ordinary skill in the art. However, example implementations of the social media environment 100 are not limited to microblogs, and could be any social media environment. The illustrated social media environment 100 includes a plurality of devices 110-135, communicatively connected to one another via, for example, a network 105 (e.g., by wireline and/or wireless connections).

Devices 110-135 may include, but are not limited to, a computer 115 (e.g., a laptop computing device), mobile devices 110, 130 (e.g., smartphone or tablet), a television 125, a device associated with a vehicle 120, a wearable device 133 (such as a smart watch), and a server computer 135. The devices 110-135 may have a computing environment as shown below in FIG. 9.

In some example implementations, one or more of the devices 110-135 may be associated with a user (e.g., the device 110 may be used by the user 150 to draft, edit, upload and transmit a social media post 140). For example, the device 110 associated with user 150 may transmit the social media post 140 to the social media environment 100 and be received to the other devices 115-135 associated with other respective users via the network 105. Further, each of the other devices 115-135 may optionally (indicated by broken line) be used to send a reply 145 to the social media post 140. In example implementations of the present application, at least one device 135 may also analyze the social media posts 140 by the user 150 to detect any references to products and, based on the detected reference, determine a probability that the user 150 would purchase using processes discussed below in FIGS. 5-8. This analysis and determination may be performed by a processor 155 connected, associated, or integrated into the device 135. As discussed below in FIGS. 2 and 3, in other example implementations, additional analysis and action may be taken based on the analysis and determinations made based on the social media posts.

Figure 2:
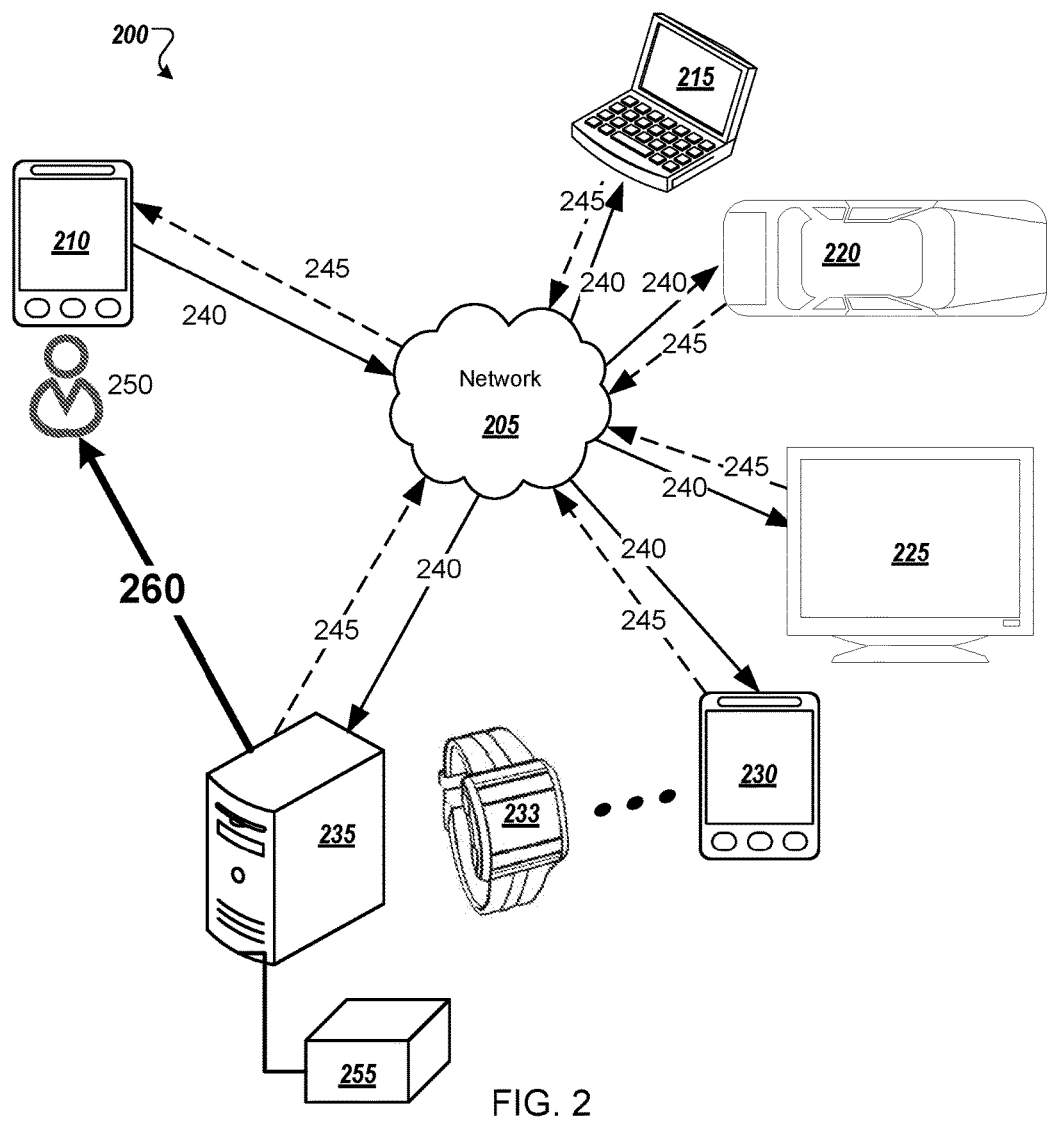
FIG. 2 illustrates another social media environment according to an example implementation of the present application.

FIG. 2 illustrates another social media environment 200 featuring user focused product information providing mechanisms according to an example implementation of the present application. Again, the social media environment 200 may be a microblog social media environment. For example, but not by way of limitation, the microblog may include TWITTER, TUMBLR, TOUT, TENCENT WEIBO or any other microblogging platform that may be apparent to a person of ordinary skill in the art. However, example implementations of the social media environment are not limited to microblogs, and could be any social media environment. Similar to FIG. 1, the illustrated social media environment 200 includes a plurality of devices 210-235, communicatively connected to one another via, for example, a network 205 (e.g., by wireline and/or wireless connections).

Devices 210-235 may include, but are not limited to, a computer 215 (e.g., a laptop computing device), mobile devices 210, 230 (e.g., smartphone or tablet), a television 225, a device associated with a vehicle 220, a wearable device 233 (such as a smart watch), and a server computer 235. The devices 110-135 may have a computing environment as shown below in FIG. 9.

In some implementations, one or more of the devices 210-235 may be associated with a user (e.g., the device 210 be used by the user 250 to draft, edit, upload and transmit a social media post 240). For example, the device 210 associated with user 250 may transmit the social media post 240 to the social media environment 200 and be received to the other devices 215-235 via the network 205. Further, each of the other devices 215-235 may optionally (indicated by broken line) be used to send a reply 245 to the social media post 240. In example implementations of the present application, at least one device 235 may also analyze the social media posts 240 by the user 250 to detect any references to products and, based on the detected reference, determine a probability that the user 250 would purchase using processes discussed below in FIGS. 5-8. This analysis and determination may be performed by a processor 255 connected, associated, or integrated into the device 235.

Further, based on a determination that the user 250 is likely to purchase the product, the processor 255 may cause the device 235 to send additional information 260 about the product directly to the user 250. For example, the additional information 260 could include advertisements for the product, information about new features of the product, consumer reviews, information about upcoming sales, discounts, or rebates, or any other information that might be apparent to a person of ordinary skill in the art to encourage the user 250 to purchase a product.

Figure 3:
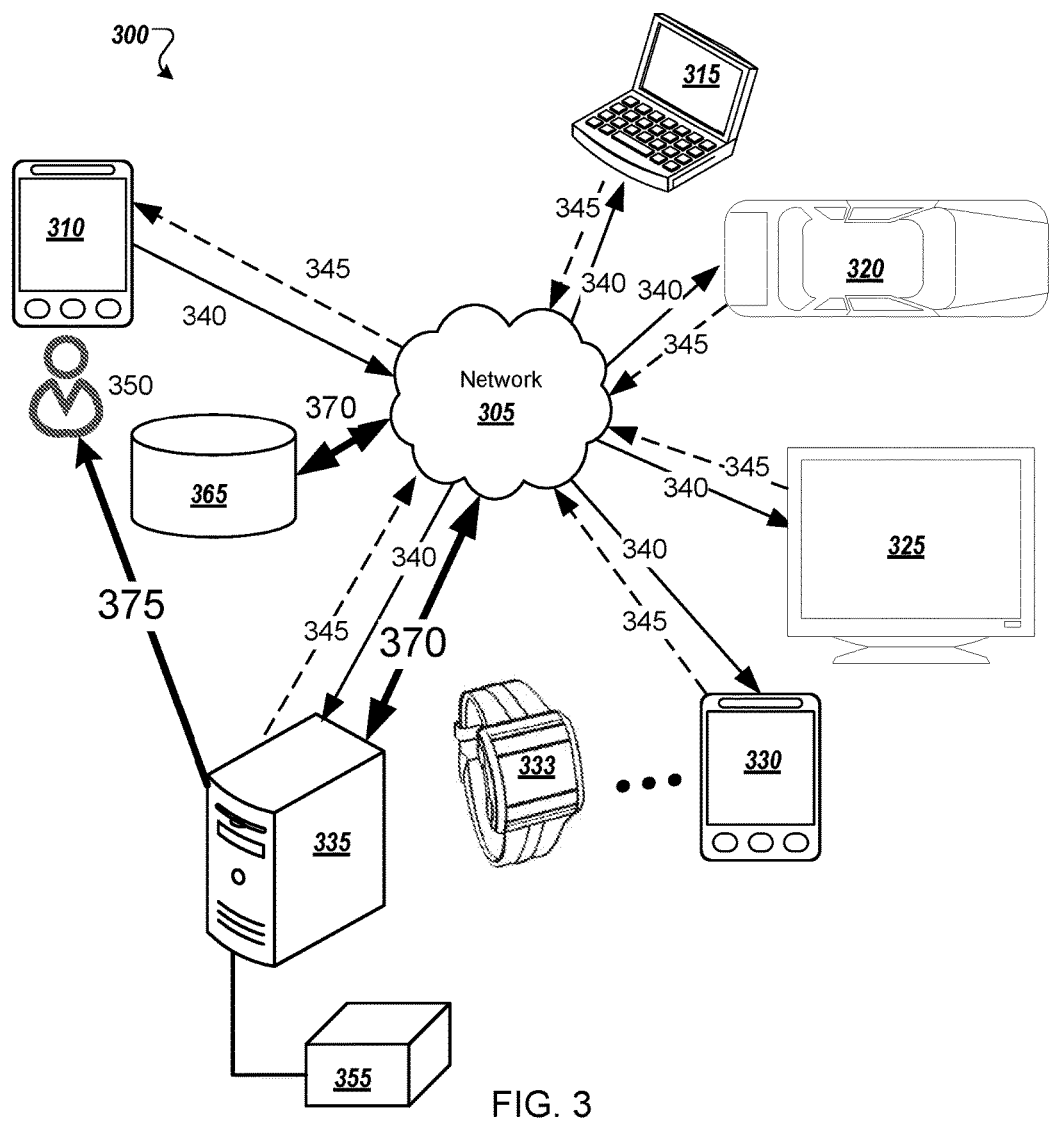
FIG. 3 illustrates yet another social media environment according to another example implementation of the present application.

FIG. 3 illustrates another social media environment 300 featuring user focused product information providing mechanisms according to another example implementation of the present application. Again, the social media environment 300 may be a microblog social media environment. For example, but not by way of limitation, the microblog may include TWITTER, TUMBLR, TOUT, TENCENT WEIBO or any other microblogging platform that may be apparent to a person of ordinary skill in the art. However, example implementations of the social media environment are not limited to microblogs, and could be any social media environment. Similar to FIGS. 1 and 2, the illustrated social media environment 300 includes a plurality of devices 310-335, and each is communicatively connected to at least one other device via, for example, a network 305 (e.g., by wired and/or wireless connections).

Devices 310-335 may include, but are not limited to, a computer 315 (e.g., a laptop computing device), mobile devices 310, 330 (e.g., smartphone or tablet), a television 325, a device associated with a vehicle 320, a wearable device 333 (such as a smart watch), and a server computer 335.

In some implementations, one or more of the devices 310-335 may be associated with a user (e.g., the device 310 used by the user 350 to draft, edit, upload and transmit a social media post 340). For example, the device 310 associated with user 350 may transmit the social media post 340 to the social media environment 300 and be received to the other devices 315-335 via the network 205. Further, each of the other devices 315-335 may optionally (indicated by broken line) be used to send a reply 345 to the social media post 340. In example implementations of the present application, at least one device 335 may also analyze the social media posts 340 by the user 350 to detect any references to products and, based on the detected reference, determine a probability that the user 350 would purchase using processes discussed below in FIGS. 5-8. This analysis and determination may be performed by a processor 355 connected, associated, or integrated into the device 335.

Further, based on a determination that the user 350 is likely to purchase the product, the processor 355 may cause the device 335 to communicate with another social media network or database 365 to detect information 370 about the user 350. For example, based on the determination that the user 350 is likely to purchase the product, the device 335 may search other social media networks or databases (such as FACEBOOK, INSTAGRAM, etc.) for other social media accounts of the user 350. Further, using the other social media accounts, the device 335 may detect information 370, such as age, geographic location, interests, hobbies, etc. associated with the user 350. Based on the detected information 370, the processor 355 may control the device 335 to send the user 350 additional information 375 about the product tailored to the user 350. For example, the additional information 375 could include advertisements for the product tailored to the user's 350 age and other demographics. The additional information 375 could also include information about new features or consumer reviews that are tailored to the user's 350 hobbies. Similarly, the additional information 375 could include information about upcoming sales, discounts, or rebates in the user's 350 geographic area.

Figure 4:
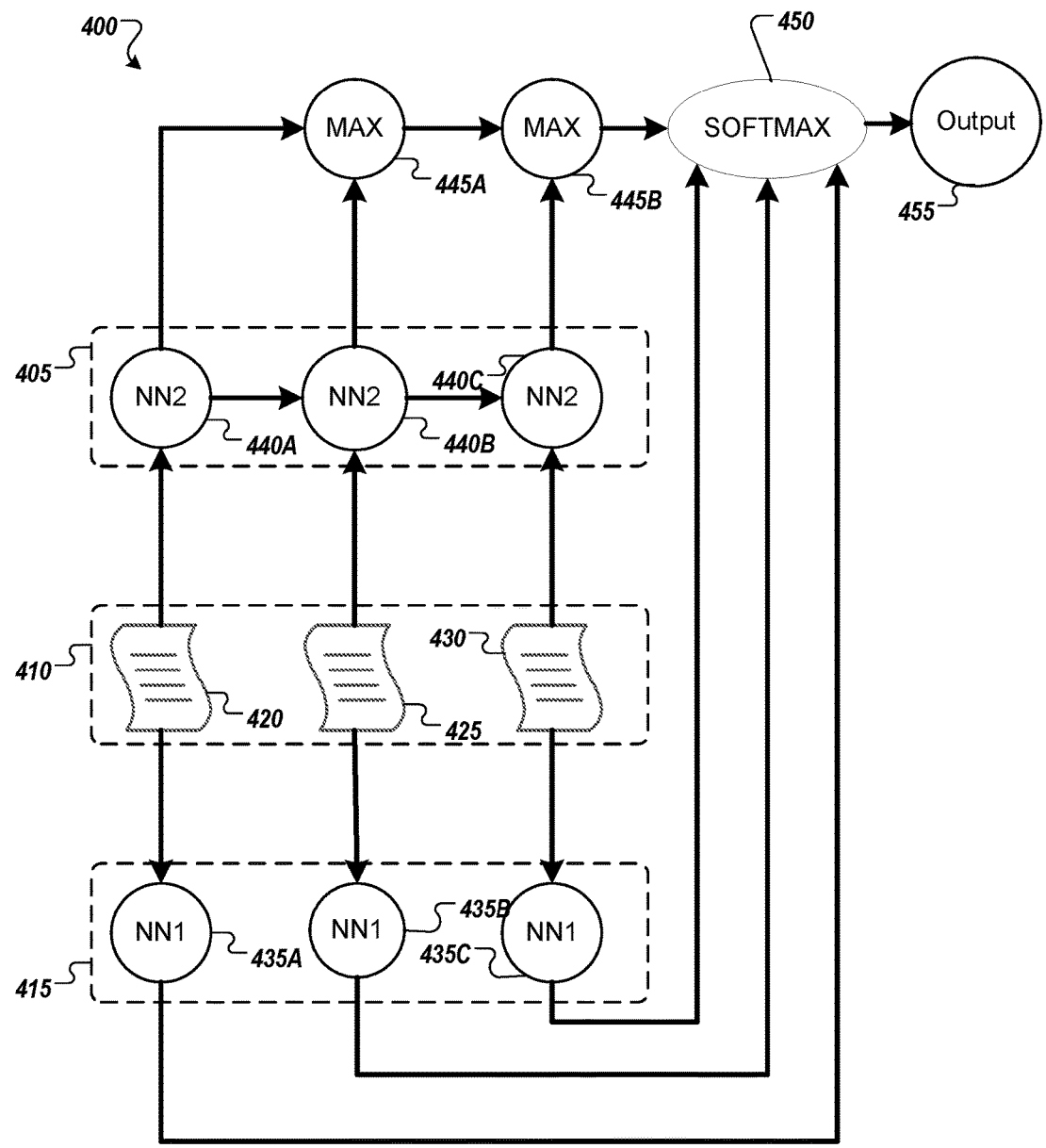
FIG. 4 illustrates a schematic representation of a consumer behavior predicting engine according to an example implementation of the present application.

FIG. 4 illustrates a schematic representation of a behavior predicting engine 400 according to an example implementation. The predicting engine 400 could be used by a processor (such as processor 155, 255, 355) of a device (such as device 135, 235, or 335) to calculate a probability a user will purchase a product. The predicting engine 400 includes an input layer 410 that receives one or more sequential social media posts 420, 425, 430 (i.e., social media post 420 occurs before social media post 425, which in turn occurs before social media post 430) that have been detected to contain a reference to a specific subject, such as a product, by a computing device.

The predicting engine 400 also includes a bottom layer 415 that uses a first neural network (NN1) to analyze each of the one or more social media posts 420, 425, 430 to determine relevance at each junction 435A-435C. For example, the first neural network (NN1) may analyze the first social media post 420 at 435A. Further, the first neural network (NN1) may analyze the second social media post 425 at 435B. Still further, the first neural network (NN1) may analyze the third social media post 430 at 435C.

A variety of neural networks or other classifiers could be used including, but not limited to, a Logistic-Regression-Model classifier, a Feed-Forward Neural Network, a Recurrent Neural Network, a Long Short-Term Memory Neural Network, or any other type of neural network or classifier that may be apparent to a person of ordinary skill in the art. Example processes for determining the relevance via the bottom layer 415 are discussed in greater detail below with respect to FIGS. 5-8 below. The outcome of the relevance analysis 435A, 435B, 435C of each of the one or more social media posts 420, 425, 430 is output to a SOFTMAX classifier 450 (i.e., a computer implemented classification function implementing a SOFTMAX regression model) to be used in determining a probability of purchasing the product.

The predicting engine 400 also includes a hidden layer 405 that uses a second neural network (NN2) to determine an output at each junction 440A-440C based on each of the one or more social media posts 420, 425, 430 at each junction 440A-440C. As discussed below, the output determined at each junction 440A-440C will be used to determine a probability of purchasing the product. A variety of neural networks or other classifiers could be used including, but not limited to, Logistic-Regression-Model classifier, A Feed-Forward Neural Network, a Recurrent Neural Network, a Long Short-Term Memory Neural Network, or any other type of neural network or classifier that may be apparent to a person of ordinary skill in the art. Example processes for determining a probability that a user will purchase the product are discussed in greater detail below with respect to FIGS. 5-8 below.

In some example implementations, the second neural network (NN2) may sequentially analyze each of the one or more social media posts 420, 425, 430 and use the output of each preceding analysis 440A-440C to analyze subsequent posts. For example, the second neural network (NN2) may analyze the first social media post 420 to determine an output associated with the first social media post 420 at 440A. The second neural network may then analyze the second social media post 425 to determine an output associated with the second social media post 425 at 440B and factor in the determined output associated with the first social media post 420 from 440A, as explained above. Similarly, the second neural network may then analyze the third social media post 430 to determine an output associated with the second social media post 425 at 440C and factor in the determined output of purchasing associated with the second social media post 425 from 440B.

The output associated with each social media post 420, 425, 430 from 440A-400C are then supplied to maximum determiner (MAX) at 445A-44B after each subsequent social media post 425, 430 is analyzed. For example, the output associated with the first social media post 420 from 440A and the output associated the second social media post 425 from 440B is provided to the maximum determiner (MAX) at 445A after the second social media post 425 is analyzed. Further, the outcome of the maximum determiner (MAX) from 445A is compared at 445B to the output associated with the third social media post 430 from 440C. Once all of the social media posts 420, 425, 430 have been analyzed, the maximum determiner (MAX) provides an output to the SOFTMAX classifier 450.

The SOFTMAX classifier 450 determines whether a user is likely to purchase the product based on the provided output of the maximum determiner (MAX) at 445B and the received outcome of the relevance analysis of each of the one or more social media posts 420, 425, 430 received from the bottom layer. Based on the determination of the SOFTMAX classifier 450, the processor (such as processor 155, 255, 355) of a device (such as device 135, 235, or 335) may send additional information about the product to a user or may take other actions as discussed below.

As used herein reference to "Top Layer" and "Bottom Layer" are made with reference to their respective placement in FIG. 4 and are not intended to limit their implementation. The illustrated layers may be graphically rearranged in any alternative arrangement that may be apparent to a person of ordinary skill in the art without departing from the scope of the present application.

Figure 5:
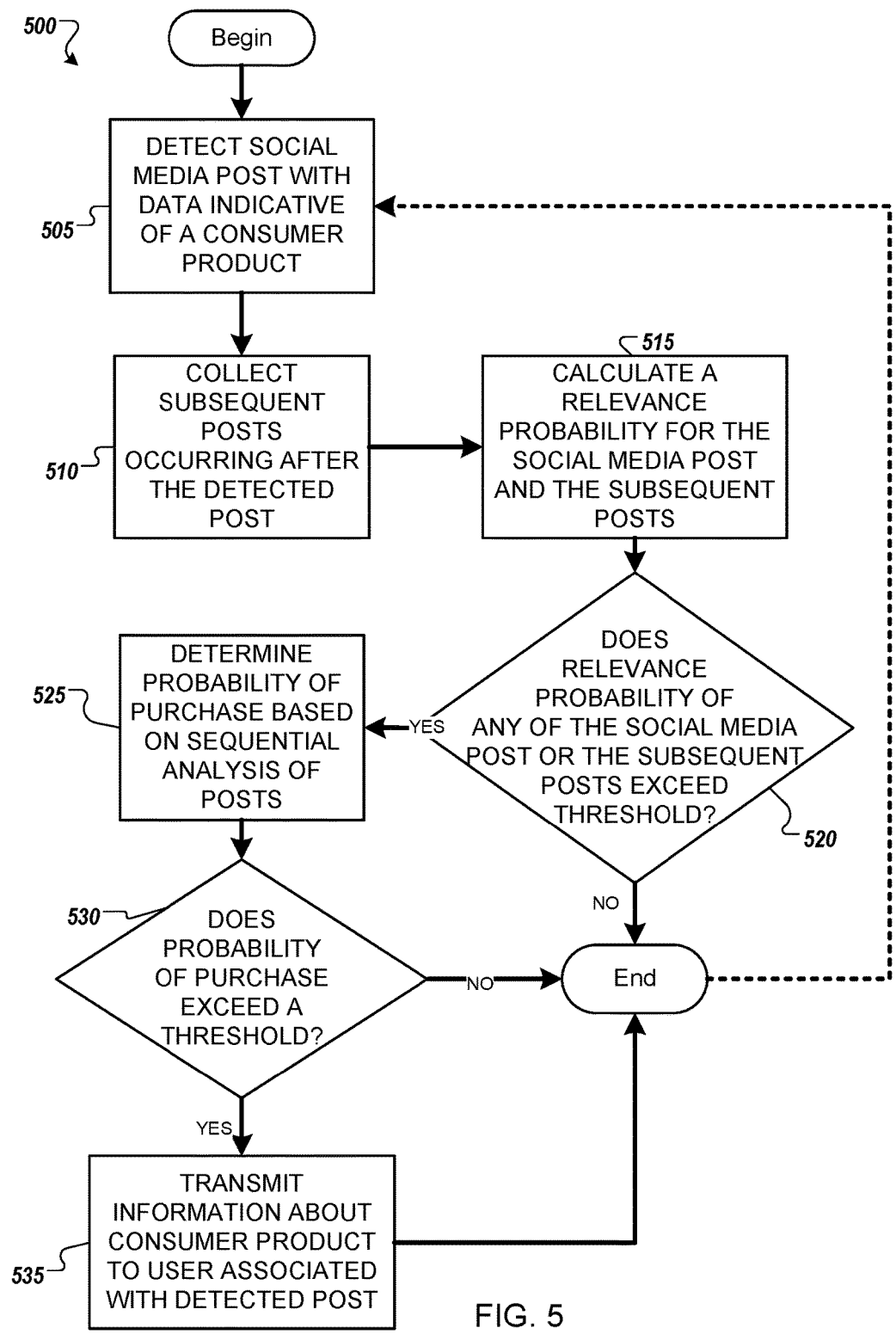
FIG. 5 illustrates an example flow diagram of a process for providing user focused product information according to example implementations of the present application.

FIG. 5 illustrates an example flow diagram of a process 500 for providing user focused product information according to an example implementation of the present application.

The illustrated process 500 may be performed by a processor (such as processor 155, 255, 355) of a device (such as device 135, 235, or 335) to provide user focused product information. In process 500, a social media post containing data indicative of a specific product is detected at 505. The data could be text or audio describing or referencing the product, such as the name of make or model of the product or a general reference to the product. The data could also be an image or video of a make or model of the product. The data could be detected at 505 by analyzing all social media posts to a specific social media source or network. The data could also be detected at 505 by focusing on groups or sub-groups in a social media source or network dedicated to products generally, particular types of products (such as camera, mobile phones, or cars), or to particular manufacturers. The grouping and subgrouping is not limited to the above and other example groupings may be employed.

Once a social media post containing data indicative of the product is detected, subsequent social media posts by the same user or author occurring after the detected social media post are collected for a period of time at 510. In some example implementations, all subsequent media posts by the same user or author are collected for the period of time, regardless of whether a product or product type is specified. In other example implementations, only subsequent media posts that also contain data indicative of the product are collected (i.e., social media posts that also contain references or data indicative of the same product detected in the initial social media post). In some example implementations, the subsequent posts may be collected for a period of 60 days. In other example implementations, the subsequent posts could be collected for less than 60 days, or for more than 60 days.

After the subsequent social media posts are collected for a period of time, both the detected post and the subsequent posts may each individually be analyzed and a relevance probability calculated, using a first neural network at 515. Additionally, the detected post and the subsequent posts may optionally be classified as either relevant or not relevant to determining a probability of purchasing behavior, based on the calculated relevance probability exceeding a threshold. In some example implementations, the calculating of the relevance probability of the detected post and subsequent posts is performed by a feed-forward neural network. In other example implementations, the classifying may be performed by another type of neural network or classifier. The process of calculating the relevance probability is discussed in greater detail with respect to FIG. 6 below.

Once a relevance probability is calculated for each of the detected post and any collected subsequent posts, the processor may determine if any posts have a relevance probability that exceeds a threshold at 520. If no posts have a relevance probability that exceeds the threshold (NO—520), the process 500 may end. In some example embodiments, the process 500 may optionally return to 505 to await any new social media posts containing data indicative of a specific product being detected. Conversely, if any post has a relevance probability that exceeds the threshold (YES—520), the process 500 continues to 525. In some example implementations, the process 500 may proceed to 525, even if no post has a relevance probability that exceeds a threshold, or the determination at 520 may be omitted.

At 525, all posts that contain data indicative of the product are sequentially (i.e., in the order that the posts were transmitted or authored) analyzed using a second neural network to determine a probability that the user who authored the posts will purchase the identified product. In some example implementations, at 525, all posts (i.e., the detected post and all collected subsequent posts) may be sequentially analyzed, even if some posts do not contain data indicative of the product or product type (e.g., posts following the first mention of product or product type). In some example implementations, a sigmoid function or a SOFT-MAX function may be used to calculate the probability at 525.

In some example implementations, a Long Short-Term Memory Neural Network may be used to perform the sequential analysis. In other example implementations, the sequential analysis may be done by another type of neural network and may not be limited to the examples described herein. The process of determining the probability that the user who authored the posts will purchase the identified product is discussed in greater detail with respect to FIG. 7 below.

Once the probability that the user who authored the posts will purchase the identified product has been determined, the processor may determine if the probability exceeds a confidence level threshold value at 530. In some example implementations, the confidence level threshold value may vary based on a variety of factors including, but not limited to, the number of subsequent posts detected, the calculated relevance probabilities of each of the obtained first post and the at least one subsequent post, and the type of product referenced. The confidence level threshold value may also vary based on a desired high purchaser strength level (i.e. classification that purchasers are very likely to purchase). For example, if only purchasers who are "very likely" to purchase should be targeted, the confidence level threshold value could be set higher. The confidence level threshold value may also vary based on a desired high purchaser conversion count (i.e., desire to capture lots of purchasers). For example, if any potential purchaser should be targeted, the confidence level threshold value could be set lower.

If the probability does not exceed the threshold value (NO—530), the process 500 may end. In some example embodiments, the process 500 may optionally return to 505 to await any new social media posts containing data indicative of a specific product being detected. Conversely, if the probability exceeds the threshold value (YES—520), the process 500 continues to 535.

At 535, information relating to the product may be transmitted to the user associated with the detected post, such as the author or the owner of the social media account. The type of information transmitted to the user is not particularly limited and may include advertisements for the product, information about new features of the product, consumer reviews, information about upcoming sales, discounts, or rebates, or any other information that might be apparent to a person of ordinary skill in the art to encourage the user to purchase the product. The additional information may be transmitted in a variety of ways including web browser pop-ups, emails, instant messages, social media messages, or any other mechanism for transmitting information to a social media account user that may be apparent to a person of ordinary skill in the art.

After the additional information has been transmitted to the user associated with the detected post at 535, the process 500 may end. In some example embodiments, the process 500 may optionally return to 505 to await any new social media posts containing data indicative of a specific product being detected.

Figure 6:
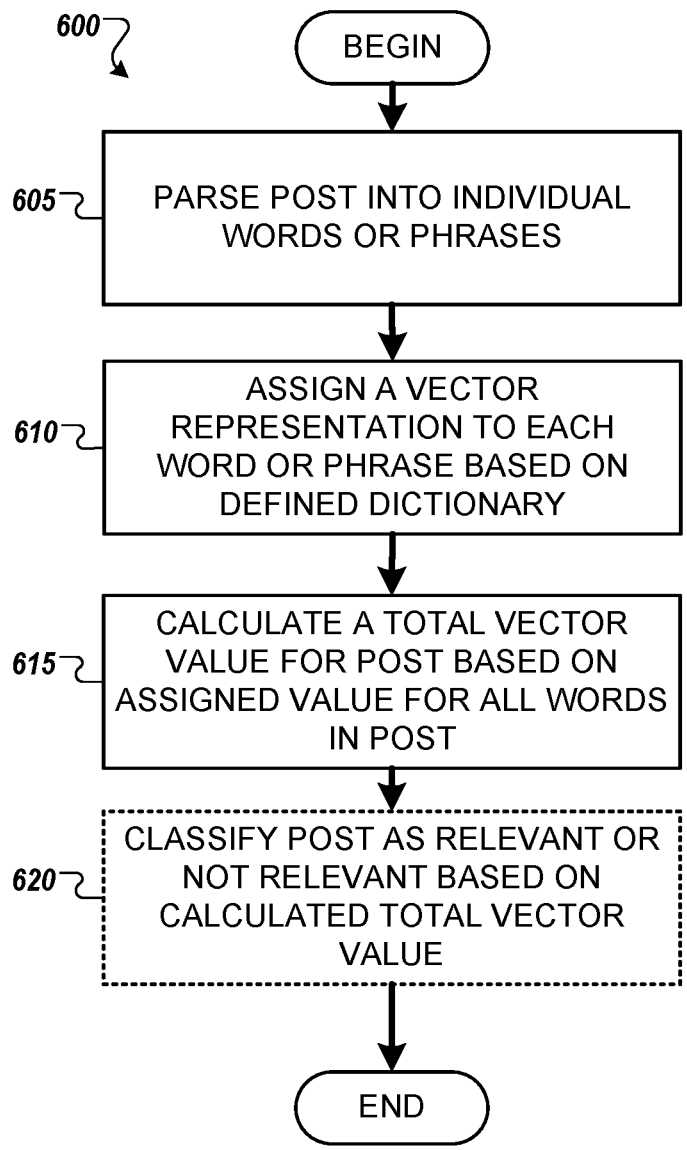
FIG. 6 illustrates an example flow diagram of a process for calculating the relevance probability for social media posts according to an example implementation of the present application.

FIG. 6 illustrates an example flow diagram of a process 600 for calculating a relevance probability according to an example implementation of the present application. The illustrated process 600 may be used by a processor (such as processor 155, 255, 355) of a device (such as device 135, 235, or 335) to provide user focused product information. The process 600 may be used to classify social media posts as relevant as part of a process for providing user focused product information, such as illustrated in FIG. 5 (above) and FIG. 8 (discussed below). However, the process 600 is not limited to only being used as a process for providing user focused product information and may be used for other purposes as may be apparent to a person of ordinary skill in the art.

In order to determine the relevance of each social media post, each post must first be parsed or divided into individual words or phrases in 605. With text or audio based social media posts, each word may be detected and recognized using known natural language processing techniques (such as voice recognition and text recognition techniques). With image or video based social media posts, object recognition techniques may be used to first identify any visually illustrated content and generated text based descriptions, which can then be parsed into individual words and phrases.

Once each post is divided into individual words or phrases, a vector representation is assigned to each word or phrase based on a pre-defined dictionary or tool-kit at 610. For example, each word or phrase may be converted into a vector representation using the pre-defined tool-kit, such as the known word2vec toolkit. Toolkits, such as word2vec, learn vector representations from the weights of a neural network trained on language modeling tasks using existing data sets from various sources, such as news data sets. Other tool-kits or dictionaries that may be apparent to a person of ordinary skill in the art may be used.

In some example implementations, the parsing of each post in 605 and the assigning the vector representation in 610 may be considered pre-processing of each social media post.

In some example implementations, the pre-processing of each social media post may be performed twice: once when determining the social media post relevance probability as discussed above with respect to 605 and 610, and once when determining a probability of purchasing as discussed with respect to FIG. 7, as explained below. In other example implementations, the pre-processing of each social media post may only be performed once in a single process (e.g., only at 605 and 610, followed by omission of 705 and 710 from FIG. 7), and the results of the single process (e.g., 605 and 610) may be used for both determining the social media post relevance probability and determining the probability of purchasing (e.g., 715 through 735) as discussed with respect to FIG. 7 below.

Once vectors have been determined for each word or phrase of the social media post, all of the vectors are then summed to form a vector representation of the social media post at 615. The vector representation determined in 615 corresponds to the relevance probability associated with the social media post. Once the vector representation is determined for each social media post, the resulting vector representations (i.e., relevance probability) may optionally be fed into the first neural network of the bottom layer 415 of the predicting engine 400 of FIG. 4 to classify each post as relevant or not relevant at 620. In some example implementations, the first neural network may be a Feed-Forward Neural Network. However, in other example implementations, a variety of neural networks or other classifiers could be used including a Logistic-Regression-Model classifier, a Recurrent Neural Network, A Long Short-Term Memory Neural Network, or any other type of neural network or classifier that may be apparent to a person of ordinary skill in the art.

The first neural network has been pre-trained using manual classification by a human operator, and based on the pre-training, the first neural network is configured to classify each post. For example, during pre-training, the first neural network is provided with a large volume of social media posts relating to the product of concern (such as phones, tablets, computers, cameras, cars, etc.), which have been classified as either relevant or not relevant. Based on the pre-training, the first neural network can classify new social media posts as relevant or not relevant using the vector representations calculated in 615.

Once all of the social media posts have been classified relevant or not relevant, the calculation process 600 may end. In some implementations, the calculation process 600 may end at 615 after the total vector value (i.e. relevance probability) is calculated for each post. If the calculation process 600 is being done as part of a process for providing user focused product information, such as illustrated in FIG. 5 (above) and FIG. 8 (discussed below), the process for providing user focused product information may continue as discussed with respect to FIGS. 5 and 8.

Figure 7:
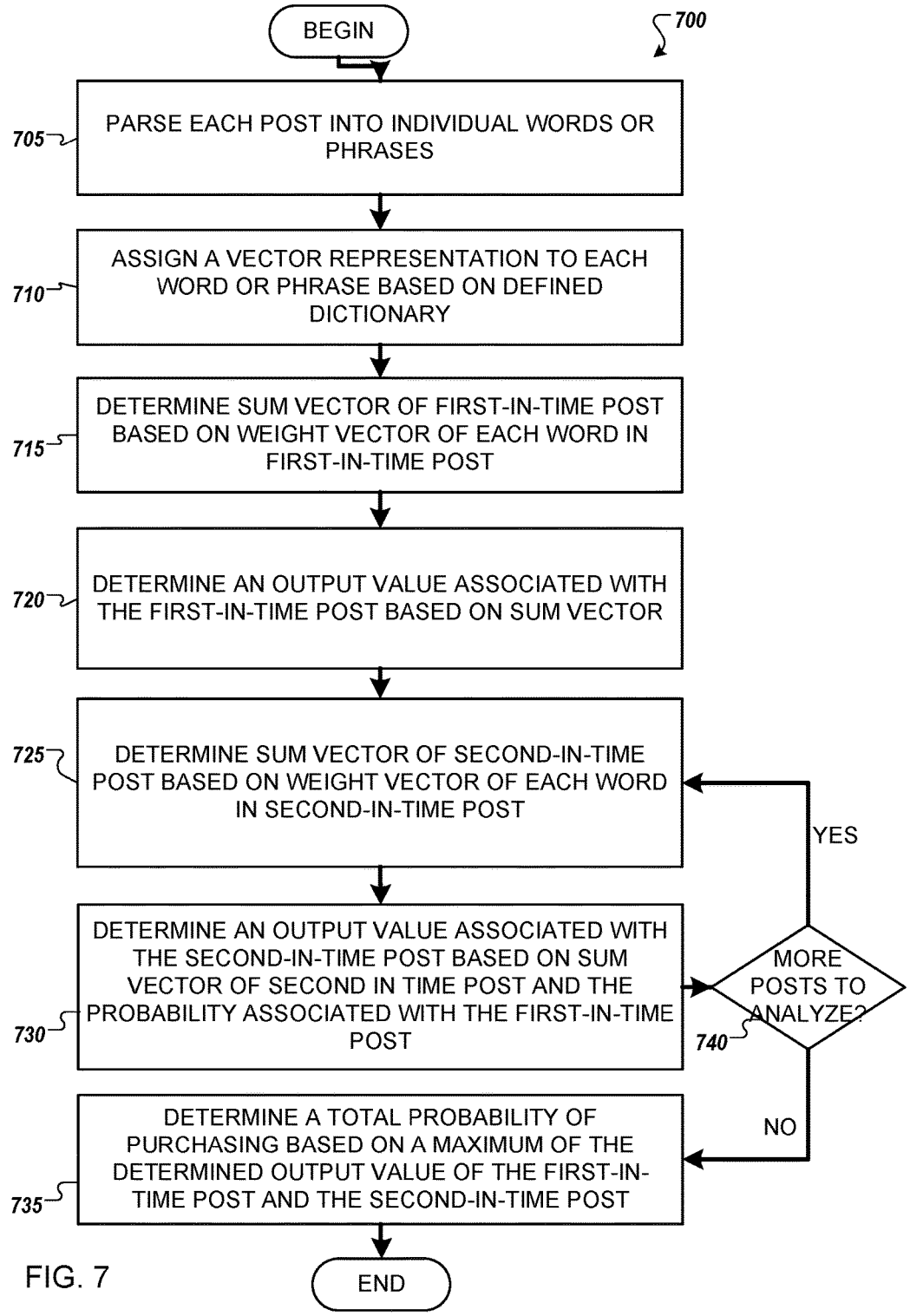
FIG. 7 illustrates an example flow diagram of a process for determining a user's probability of purchasing a product according to an example implementation of the present application.

FIG. 7 illustrates an example flow diagram of a process 700 for determining a user's probability of purchasing a product according to an example implementation of the present application. The illustrated process 700 may be used by a processor (such as processor 155, 255, 355) of a device (such as device 135, 235, or 335) to provide user focused product information. The process 700 may be used to determine a user's probability of purchasing a product according to social media posts as part of a process for providing user focused product information, such as illustrated in FIGS. 5 (above) and 8 (discussed below). However, the process 700 is not limited to only being used in a process for providing user focused product information and may be used for other purposes as may be apparent to a person of ordinary skill in the art.

To predict whether or not a user will buy a product such as a mobile device or a camera, a model must learn from social media posts written by that user. Thus, to determine a user's probability of purchasing a product, each post must be parsed or divided into individual words or phrases in 705. With text or audio based social media posts, each word may be detected and recognized using known natural language processing techniques (such as voice recognition and text recognition techniques). With image or video based social media posts, object recognition techniques may be used to first identify any visually illustrated content and generated text based descriptions, which can then be parsed into individual words or phrases.

Once each post is divided into individual words, a vector representation is assigned to each word or phrase based on a pre-defined dictionary or tool-kit at 710. For example, each word or phrase may be converted into a vector representation using the pre-defined tool-kit, such as the known word2vec toolkit. Toolkits, such as word2vec, learn vector representations from the weights of a neural network trained on language modeling tasks using existing data sets from various sources, such as news data sets. Other tool-kits or dictionaries that may be apparent to a person of ordinary skill in the art may be used.

In some example implementations, the parsing of each post in 705 and the assigning the vector representation in 710 may be considered pre-processing of each social media post. In some example implementations, the pre-processing of each social media post may be performed twice: once when determining the social media post relevance probability was discussed with respect to FIG. 6 above, and once when determining a probability of purchasing (e.g., 705 and 710). In other example implementations, the pre-processing of each social media post may only be performed once or in a single process (e.g., only at 605 and 610, followed by omission of 705 and 710 from FIG. 7), and the results of the single process (e.g., 605 and 610) may be used for both determining the social media post relevance probability and determining the probability of purchasing (e.g., 715 through 735) as discussed with respect to FIG. 7 below.

Once vectors have been determined for each word or phrase of the first-in-time social media post published or transmitted all of the vectors of the words or phrases of the first-in-time social media post are then summed to form a vector representation of the first-in-time social media post at 715.

Once the vector representation is determined for the first-in-time social media post, the hidden layer output is fed into the second neural network of the hidden layer 405 of the predicting engine 400 of FIG. 4 to determine an output value associated with the first-in-time post at 720. In some example implementations, the second neural network may be a Long Short-Term Memory Neural Network. However, in other example implementations, a variety of neural networks or other classifiers could be used including a Logistic-Regression-Model classifier, a Feed-Forward Neural Network, a Recurrent Neural Network, or any other type of neural network or classifier that may be apparent to a person of ordinary skill in the art.

The second neural network has been pre-trained using manual classification by a human operator. For example, during training, the second neural network is provided with a large volume of social media posts relating to the product of concern (such as phones, tablets, computers, cameras, cars, etc.) Based on the training, the second neural network can calculate an output value based on the summed vector using the vector representation calculated in 715.

Once an output value associated with the first-in-time post is calculated, all of the vectors of the words or parts of the second-in-time social media post are summed to form a vector representation of the second-in-time social media post at 725.

Once the vector representation is determined for the second-in-time social media post, the resulting vector representation is fed into the second neural network of the hidden layer 405 of the predicting engine 400 of FIG. 4 to determine an output value associated with the second-in-time post at 730. Again, the second neural network may be a Long Short-Term Memory Neural Network. As a Long Short-Term Memory Neural Network includes a memory of previous determinations, the second neural network can determine an output value associated with the second-in-time post based not only on the content of the second-in-time post, but can take the determined output value of the first-in-time post in some example implementations. Accordingly, the second neural network can adjust the determined output value associated with the second-in-time post, based on the determined output value of the first-in-time post. For example, the probability output value with the second-in-time post may be increased or decreased based on the determined output value associated with the first-in-time post.

In example implementations featuring a second neural network with a memory of previous determinations, the second neural network may be trained by having social media posts feed in sequentially (i.e., in the order of publication or transmission). To provide regularization, early stopping techniques and neuron dropping may be employed. For example, dropout rates between about 25-50% of neurons may be used depending on the type of neural network used.

At 740, a determination is made if more collected posts need analysis (i.e., were more than two posts collected). If additional posts require analysis (YES—740), process steps 725 and 730 may be sequentially repeated for subsequent posts (i.e., a third-in-time post, a fourth-in-time post), each time using the determined output value associated with a preceding post to determine the output value associated with a subsequent post (i.e., using probability associated with a second-in-time post when determining probability associated with third-in-time post, etc.). If no more posts require analysis (NO—740), the process 700 proceeds to 735 discussed below.

Once the output value associated with all the social media posts is determined, a total probability of purchasing is determined based on the output value associated with the first-in-time post and the second-in-time post, and optionally other subsequent posts. In some example implementations, the total probability may be determined by determining a local maximum between the output value associated with the first-in-time post and output value associated the second-in-time post. If at least two posts are analyzed, a global maximum may be determined from all of the output value associated with all analyzed posts, either by iteratively determining a maximum output value between each sequent post and a determined local maximum of preceding posts, or by ranking and ordering all determined output values. In some example implementations, a user associated with the posts may be classified as a predicted purchaser based on the determined total probability.

Once a total probability of purchasing is determined based on all of the analyzed posts, the process 700 ends. In some example implementations, the process 700 may be performed on all collected posts or it may only be performed on posts containing data (i.e., a reference) relating to the product of concern. If the process 700 is being done as part of a process for providing user focused product information, such as illustrated in FIG. 5 (above) and FIG. 8 (discussed below), the determined total probability may be used by the processor as the probability of purchasing in the process for providing user focused product information as discussed with respect to FIGS. 5 and 8. In some example implementations, the determination of the total purchase probability may include using a SOFTMAX classifier to determine the total purchase probability based on the output values associated with the collected posts and the calculated relevant probabilities as discussed with respect to FIG. 4 above.

Figure 8:
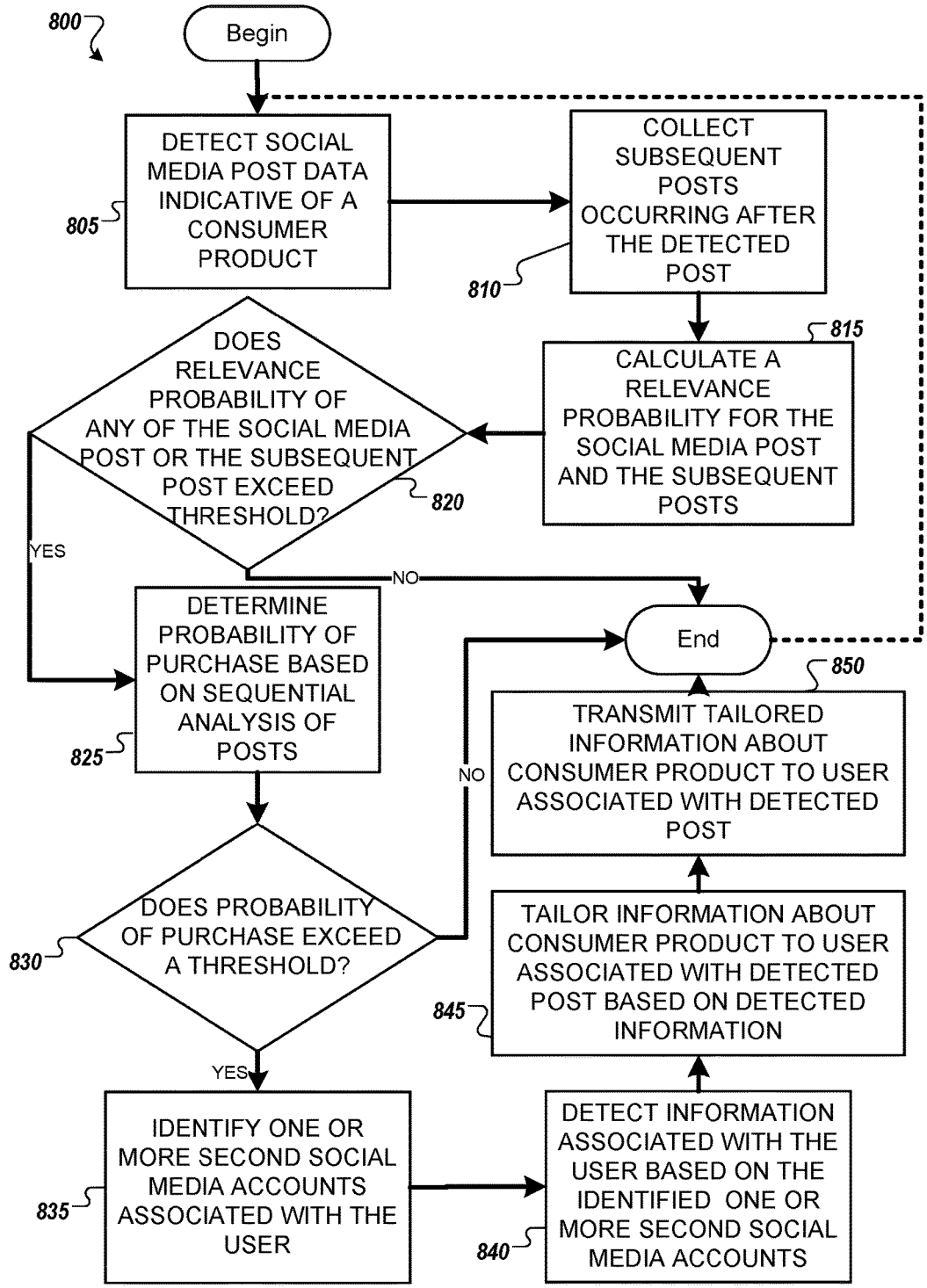
FIG. 8 illustrates an example flow diagram of a process for providing user focused product information according to another example implementation of the present application.

FIG. 8 illustrates an example flow diagram of a process 800 for providing user focused product information according to other example implementations of the present application. The process 800 illustrated in FIG. 8 shares some aspects similar to the process 500 illustrated in FIG. 5, and similar reference numerals and descriptions may be used. The illustrated process 800 may be used by a processor (such as processor 155, 255, 355) of a device (such as device 135, 235, or 335) to provide user focused product information. In process 800, a social media post containing data indicative of a specific product is detected at 805. The data could be text or audio describing or referencing the product, such as the name of make or model of the product or a general reference to the product. The data could also be an image or video of a make or model of the product. The data could be detected at 805 by analyzing all social media posts to a specific social media source or network. The data could also be detected at 805 by focusing on groups or sub-groups in a social media source or network dedicated to products generally, particular types of products (such as camera, mobile phones, cars, etc.), or to particular manufacturers.

Once a social media post containing data indicative of the product is detected, subsequent social media posts by the same user or author occurring after the detected social media post are collected for a period of time at 810. In some example implementations, all subsequent media posts by the same user or author are collected for the period of time. In other example implementations, only subsequent media posts that also contain data indicative of the product are collected (i.e., social media posts that also contain references or data indicative of the same product detected in the initial social media post). In some example implementations, the subsequent posts may be collected for a period of 60 days. In other example implementations, the subsequent posts could be collected for less than 60 days, or for more than 60 days.

After the subsequent social media posts are collected for a period of time, both the detected post and the subsequent posts may each individually be analyzed and a relevance probability calculated, using a first neural network at 815. Additionally, the detected post and the subsequent posts may optionally be classified as either relevant or not relevant to determining a probability of purchasing behavior, based on the calculated relevance probability exceeding a threshold. In some example implementations, the calculating of the relevance probability of the detected post and subsequent posts is done by a Feed-Forward Neural Network. In other example implementations, the classifying may be done by another type of neural network or classifier. The process of calculating the relevance probability is discussed in greater detail with respect to FIG. 6 above.

Once a relevance probability is calculated for each of the detected post and any collected subsequent posts, the processor may determine if any posts have a relevance probability that exceeds a threshold at 820. If no posts have a relevance probability that exceeds the threshold (NO—820), the process 800 may end. In some example embodiments, the process 800 may optionally return to 805 to await any new social media posts containing data indicative of a specific product being detected. Conversely, if any post has a relevance probability that exceeds the threshold (YES—820), the process 800 continues to 825. In some example implementations, the process 800 may proceed to 825, even if no post has a relevance probability that exceeds a threshold, or the determination at 820 may be omitted.

At 825, all posts that contain data indicative of the product are sequentially (i.e., in the order that the posts were transmitted or authored) analyzed using a second neural network to determine a probability that the user who authored the posts will purchase the identified product. In some example implementations, all posts (i.e., the detected post and all collected subsequent posts) may be sequentially analyzed, even if some posts do not contain data indicative of the product. In some example implementations, a sigmoid function or a SOFTMAX function may be used to calculate the probability at 825.

In some example implementations, a Long Short-Term Memory Neural Network may be used to perform the sequential analysis. In other example implementations, the sequential analysis may be done by another type of neural network. The process of determining the probability that the user who authored the posts will purchase the identified product is discussed in greater detail with respect to FIG. 7 above.

Once the probability that the user who authored the posts will purchase the identified product has been determined, the processor may determine if the probability exceeds a confidence level threshold value at 830. In some example implementations, the confidence level threshold value may vary based on a variety of factors including the number of subsequent posts detected, the calculated relevance probabilities of each of the obtained first post and the at least one subsequent post, and the type of product referenced. The confidence level threshold value may also vary based on a desired high purchaser strength level (i.e., classification that purchasers are very likely to purchase). For example, if only purchasers who are "very likely" to purchase should be targeted, the confidence level threshold value could be set higher. The confidence level threshold value may also vary based on a desired high purchaser conversion count (i.e., desire to capture lots of purchasers). For example, if any potential purchaser should be targeted, the confidence level threshold value could be set lower.

If the probability does not exceed the threshold value (NO—830), the process 800 may end. In some example embodiments, the process 800 may optionally return to 805 to await any new social media posts containing data indicative of a specific product being detected. Conversely, if the probability exceeds the threshold value (YES—830), the process 800 continues to 835.

At 835, one or more second social media accounts associated with the user are identified, based on information associated with the detected and collected posts. For example, the user name, actual name, or any other user identified information associated with the detected and collected posts may be used to identify other social media accounts associated with author of the posts detected (in 805) and collected (in 810). The one or more second social media accounts may include networking sites (such as FACEBOOK, LINKEDIN, etc.), media sharing sites (such as YOUTUBE, INSTAGRAM, etc.), or any other social media sites that may be apparent to a person of ordinary skill in the art.

At 840, after one or more second social media accounts are identified, information associated with the user is detected from the one or more second social media accounts. For example, information associated with the user may include age, geographic location, interests, hobbies, or any other information that may be apparent to a person of ordinary skill in the art.

At 845, additional information relating to the product may be tailored to the user based on the information detected from the one or more second social media accounts. For example, advertisements for the product may be tailored to the user's age and other demographics. Further, information about new features or consumer reviews may be tailored to the user's hobbies or interests. Further, information about upcoming sales, discounts, or rebates may be tailored to the user's geographic area.

At 850, after the additional information relating to product is tailored to the user, the tailored information may be transmitted to the user associated with the detected post, such as the author or the owner of the social media account. The information may be transmitted in a variety of ways including web browser pop-ups, emails, instant messages, social media messages, or any other mechanism for transmitting information to a social media account user that may be apparent to a person of ordinary skill in the art.

After the additional information has been transmitted to the user associated with the detected post, the process 800 may end. In some example embodiments, the process 800 may optionally return to 805 to await any new social media posts containing data indicative of a specific product being detected.

Evaluation of Example Implementations

Several different baseline models were evaluated for both predicting social media post relevance and determining a probability of a user purchasing using the foregoing example implementations. Results of the evaluation are discussed below.

The baseline models examined for predicting post relevance included Simple Logistic Regression Models, Feed-Forward (FF) Neural Networks, Recurrent Neural Networks (RNN), and Long Short-Term Memory (LSTM) Neural Networks. The Logistic Regression Model combined the input with a weight matrix and bias vector, and fed the result through a SOFTMAX classification layer that yielded probabilities for each output. The Feed-Forward Network enables more complex functions to be computed through the addition of a hidden layer below the SOFTMAX. A sigmoid function was also used to provide the hidden layer's non-linearity.

In a Recurrent Neural Network, information from words at the beginning of the post was preserved across time and was still accessible upon reaching the final word of the post for making a prediction. In Long Short-Term Memory Neural Network implementations, the input gate, forget gate, and candidate memory cell were computed using the input at the current "time step" and the hidden layer at the previous "time step."

To compare the models, as a baseline, the performance of a Feed-Forward Network, a Recurrent Neural Network, and a Long Short-Term Memory Neural Network were evaluated on a plurality of social media posts, specifically microblog posts, rather than sequentially scanning through individual posts.

The Logistic, Feed-Forward, and Recurrent Neural Network relevance models were trained separately first, and then the LSTM model was trained. Evaluation was performed using 10-fold cross-validation.

Social Media Post Relevance Evaluation Results

With respect to Social Media Post Relevance, the baseline models were each evaluated on four sets of Social Media Posts, each set of which mentioned a product from one of the following categories: mobile devices, cameras, game consoles, or both mobile devices and cameras. Table 1 shows the performance for each product type. The illustrated numbers represent a percentage of posts correctly classified for each relevance model.

TABLE 1

EXAMPLE POST RELEVANCE DATA

| Model | Mobile | Camera | Both | Game |
|---|---|---|---|---|
| Logistic | 79.7 | 78.8 | 74.7 | 91.9 |
| FF | 81.2 | 80.4 | 78.0 | 92.9 |
| RNN (25%) | 80.1 | 79.2 | 77.7 | 91.7 |
| LSTM (50%) | 80.2 | 77.0 | 77.0 | 91.9 |

The 10-fold cross-validation results are shown in Table 1. As illustrated, determining relevance is harder for the combined category of mobile device and camera data than for the three individual products, possibly due to differences between domain-specific relevance indicators for cameras versus mobile devices. Conversely, the performance effectiveness on game consoles was higher than that of mobile devices or cameras, possibly due to fewer game console models and therefore less variability in comments.

Customer Purchase Prediction Results

For each social media account user, all social media post containing a product mention within a 60 day span was used and the data was to users who wrote fewer than 100 product-related social media posts. The models were evaluated on mobile devices, cameras, and combined product categories. Social media account users who did not mention buying a product were used as negative examples and the models were trained on their social media posts from within the 60 day window before the most recent post mentioning wanting a product. Social media account users who did eventually post about buying a product were used as positive examples. However, for training, the "bought" posts (i.e. the post stating that the product had been bought) or any post written afterward were not used (i.e. only the social media posts written in the 60 days before the "bought" post were used).

TABLE 2

EXAMPLE PREDICTION VALIDATION DATA

| Model | Mobile | Camera | Both |
|---|---|---|---|
| FF-sum | 73.6 | 66.3 | 73.4 |
| RNN-sum | 68.5 | 66.1 | 76.1 |
| LSTM-sum | 76.9 | 65.5 | 75.3 |
| RNN | 83.2 | 80.3 | 79.60 |
| LSTM | 83.8 | 80.8 | 81.2 |
| LSTM + Preds | 84.2 | 80.5 | 81.5 |

Table 2 shows the 10-fold cross-validation results for predicting whether a user would buy a product based on social media posts from at most 60 days earlier. As expected, this is a more difficult task than the post relevance task. The Long Short-Term Memory Neural Network consistently performed better than the Recurrent Neural Network because it has the ability to retain more information from further back in time. As illustrated, the best model varied depending on the product category evaluated. However, in general, the Long Short-Term Memory Neural Network with predicted probabilities appears to perform better than the simple sequential long short-term memory neural network. The only exception was the camera category, where the performances are very similar. One possible explanation for the performance difference with the relevance bottom layer is that the camera is the only product where the ratio of relevant to not relevant posts in the training data was greater than one; for all other products, there are many more non-relevant posts.

The above discussed results are provided for illustrative purposes only and other test data could be substituted therefor. Example implementations are not limited to these illustrated results and example implementations may achieve different results depending on various factors that may be apparent to a person of ordinary skill in the art.

Example Computing Environment

Figure 9:
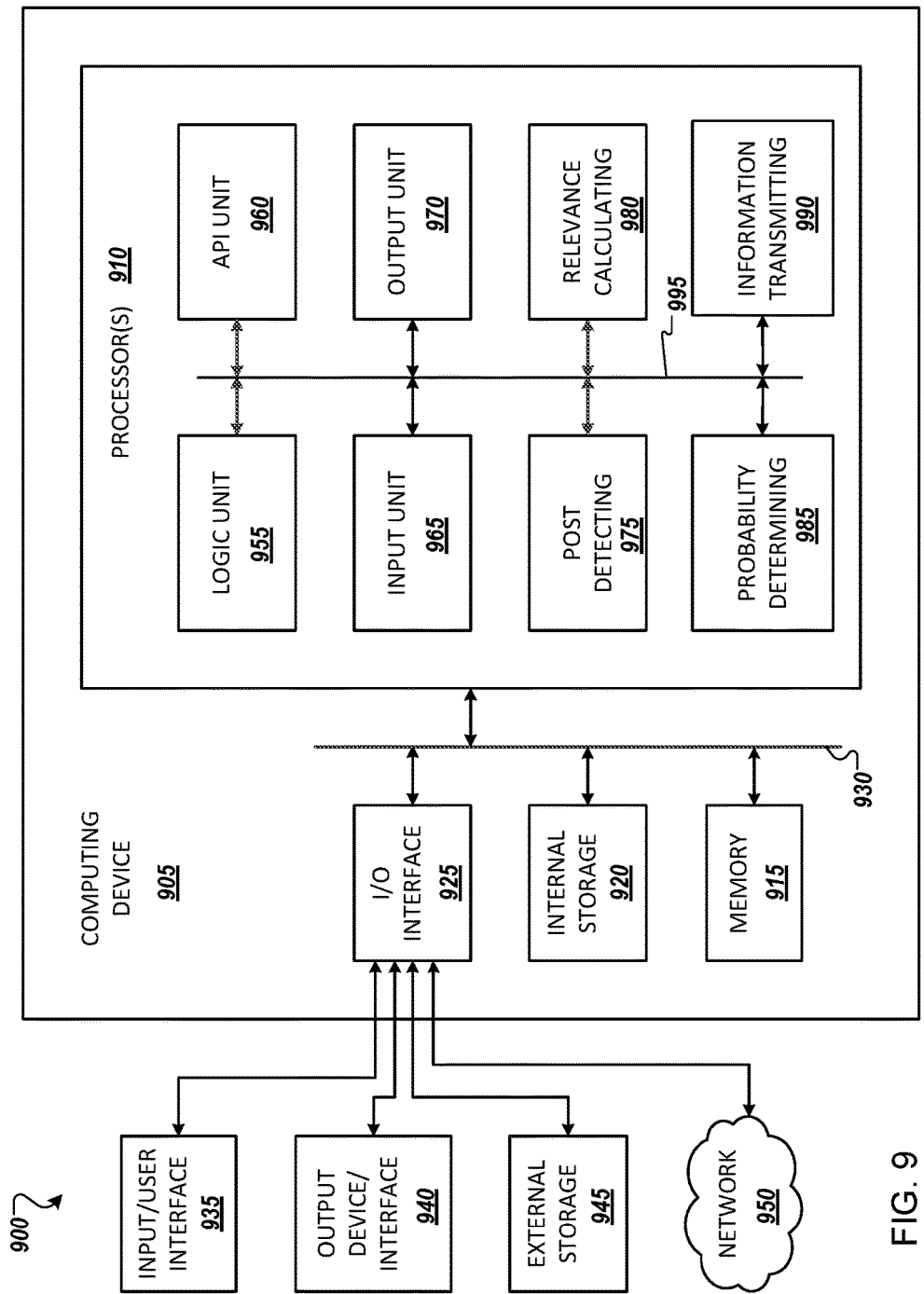
FIG. 9 illustrates an example computing environment with an example computer device suitable for use in some example implementations.

FIG. 9 illustrates an example computing environment 900 with an example computer device 905 suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, post detecting unit 975, post relevance calculating unit 980, probability determining unit 985, information transmitting unit 990, and inter-unit communication mechanism 995 for the different units to communicate with each other, with the OS, and with other applications (not shown). For example, post detecting unit 975, post relevance calculating unit 980, probability determining unit 985, information transmitting unit 990 may implement one or more processes shown in FIGS. 5-8. The described units and elements can be varied in design, function, configuration, or implementation and are not limited to the descriptions provided.

In some example implementations, when information or an execution instruction is received by API unit 960, it may be communicated to one or more other units (e.g., logic unit 955, input unit 965, output unit 975, post detecting unit 975, post relevance calculating unit 980, probability determining unit 985, and information transmitting unit 990). For example, when a social media post is received via the input unit 965, the post detecting unit 975 may analyze the post to detect a reference to a product. Additionally, when the post detecting unit 975 detects a reference, the post detecting unit 975 may also collect subsequent posts. Once the post detecting unit 975 detects a reference and collects subsequent posts, the relevance calculating unit 980 may calculate relevance probabilities for the collected posts and may optionally classify the posts as relevant and not relevant. Further, the probability determining unit 985 may evaluate the collected posts to determine a probability of a user purchasing the referenced product. Based on the determination made by the probability determining unit 985, the information transmitting unit 990 may transmit information about the reference product using the output unit 970.

In some instances, the logic unit 955 may be configured to control the information flow among the units and direct the services provided by API unit 960, input unit 965, output unit 970, post detecting unit 975, post relevance calculating unit 980, probability determining unit 985, and information transmitting unit 990 in some example implementations described above. For example, the flow of one or more processes or implementations may be controlled by logic unit 955 alone or in conjunction with API unit 960.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of recognizing a behavior of a specific user using a predictive engine having multiple processing layers, the method comprising:

receiving, by an input layer of the predictive engine, a plurality of sequential posts authored by the specific user indicative of a product and associated with a first social media account;

sequentially calculating, using a bottom layer of the predictive engine having a first neural network, a relevance probability for each of the obtained posts in the plurality of sequential posts by:

parsing, by the first neural network, each of the plurality of sequential posts into one or more digital content segments;

assigning, by the first neural network, a vector representation to each of the one or more content segments;

calculating, by the first neural network, a total vector representation for each of the plurality of sequential posts based on the vector representations assigned to each of the one or more content segments;

determining, using a hidden layer of the predicative engine having a second neural network, an output value relevant to probability of purchasing associated with each posts in the plurality of sequential posts by sequentially analyzing each post, wherein for each post in the plurality of sequential posts, each post is compared to a previously stored maximum output value, and the greater of the post and the previous stored maximum output value is newly stored as the maximum output value;

calculating a probability of purchasing the product based on the determined output values associated with each posts in the plurality of sequential posts and the stored maximum after all of the plurality of sequential posts is compared; and transmitting product-related information to the specific user associated with the posts in the plurality of sequential posts based on the determined probability of purchasing the product exceeding a specified threshold.

2. The method of claim 1, wherein the transmitting the product-related information comprises: identifying a second social media account associated with the specific user; detecting information associated with the specific user based on the identified second social media account; and tailoring the information relating to the product based on the detected information.

3. The method of claim 1, wherein the calculating the relevance probability for each of the posts in the plurality of sequential posts comprises using a feed forward neural network to calculate a relevance probability for each of the posts in the plurality of sequential posts, based on content data associated with each of the posts in the plurality of sequential posts individually.

4. The method of claim 1, wherein the calculating the relevance probability for each of the posts in the plurality of sequential posts comprises classifying at least one of the obtained posts in the plurality of sequential posts as relevant to determining a probability of purchasing the product.

5. The method of claim 1, wherein the determining an output value relevant to probability of purchasing comprises using the second neural network with memory to sequentially analyze each post in the plurality of sequential posts.

6. The method of claim 5, wherein the sequentially analyzing each post in the plurality of sequential posts comprises: determining a first output value associated with an obtained first post in the plurality of sequential posts based on the content of the first post; determining a second output value associated with each of the one or more subsequent posts in the plurality of sequential posts based on the content of the one or more subsequent posts and the determined first output value of the obtained first post; and determining a maximum output value based on the determined first output value associated with the obtained first post and the determined second output value associated with each of the one or more subsequent posts in the plurality of sequential posts.

7. The method of claim 6, wherein the calculating a probability of purchasing the product further comprises: calculating the probability of purchasing the product using a SOFTMAX function; and classifying the user as being likely to purchase the product based on the calculated probability of purchasing exceeding a confidence level threshold; wherein the confidence level threshold varies based on one or more of: a number of subsequent posts obtained, calculated relevance probabilities of each of the obtained first post and the one or more subsequent posts, a desired high purchaser strength level; a desired purchaser conversion rate, and a product type.

8. The method of claim 1, further comprising classifying a user as a predicted purchaser based on the calculated probability of purchasing the product.

9. The method of claim 1, wherein the first social media account is a microblog account.

10. The method of claim 1, wherein the obtaining the plurality of the sequential posts authored by the specific user comprises collecting a plurality of subsequent posts for a duration of time.

11. The method of claim 10, wherein the duration is 60 days.

12. A non-transitory computer readable medium having stored therein a program for making a computer execute a method of recognizing behavior of a specific user using a predictive engine having multiple processing layers, said program including computer executable instructions for performing the method comprising:

receiving, by an input layer of the predictive engine, a plurality of sequential posts authored by the specific user indicative of a product and associated with a first social media account;

sequentially calculating, using a bottom layer of the predictive engine having a first neural network, a relevance probability for each of the obtained posts in the plurality of sequential posts by:

parsing, by the first neural network, each of the plurality of sequential posts into one or more digital content segments;

assigning, by the first neural network, a vector representation to each of the one or more content segments;

calculating, by the first neural network, a total vector representation for each of the plurality of sequential posts based on the vector representations assigned to each of the one or more content segments;

determining, using a hidden layer of the predicative engine having a second neural network, an output value relevant to probability of purchasing associated with each posts in the plurality of sequential posts by sequentially analyzing each post, wherein for each post in the plurality of sequential posts, each post is compared to a previously stored maximum output value, and the greater of the post and the previous stored maximum output value is newly stored as the maximum output value;

calculating a probability of purchasing the product based on the determined output values associated with each posts in the plurality of sequential posts and the stored maximum after all of the plurality of sequential posts is compared; and transmitting product-related information to the specific user associated with the posts in the plurality of sequential posts based on the determined probability of purchasing the product exceeding a specified threshold.

13. The non-transitory computer readable medium of claim 12, wherein the transmitting information comprises: identifying a second social media account associated with the specific user; detecting information associated with the specific user based on the identified second social media account; and tailoring the information relating to the product based on the detected information.

14. The non-transitory computer readable medium of claim 12, wherein the calculating, the relevance probability for each of the posts in the plurality of sequential posts comprises using a feed forward neural network to calculate a relevance probability for each of the obtained posts in the plurality of sequential posts, based on content data associated with each of the obtained posts in the plurality of sequential posts individually.

15. The non-transitory computer readable medium of claim 12, wherein the determining an output value relevance to probability of purchasing the product comprises using the second neural network with memory to sequentially analyze each post in the plurality of sequential posts, and wherein the sequentially analyzing each post comprises: determining a first output value associated with an obtained first post in the plurality of sequential posts based on the content of the first post; determining a second output value associated with each of one or more subsequent posts in the plurality of sequential posts based on the content of the each of the one or more subsequent posts in the plurality of sequential posts and the determined first output value of the obtained first post; and determining, a maximum output value based on the determined first output value associated with the obtained first post and the determined second output value associated with each of the one or more subsequent posts in the plurality of sequential posts.

16. The non-transitory computer readable medium of claim 15, wherein the calculating a probability of purchasing the product further comprises: calculating the probability of purchasing the product using a SOFTMAX function; and classifying the user as being likely to purchase the product based on the calculated probability of purchasing exceeding a confidence level threshold; wherein the confidence level threshold varies based on one or more of: a number of subsequent posts obtained, calculated relevance probabilities of each of the obtained first post and the one or more subsequent posts, a desired high purchaser strength level, a desired purchaser conversion rate, and a product type.

17. A server apparatus configured to recognize behavior of a specific user using a predictive engine having multiple processing layers, the server apparatus comprising:
 a memory; and
 a processor configured to function as the predictive engine having multiple processing layers:
  receive, by an input data of the predicative engine, a plurality of sequential posts authored by the specific user indicative of a product and associated with a first social media account;
  sequentially calculate, using a bottom layer of the predictive engine having a first neural network, a relevance probability for each of the obtained plurality of sequential post by:
   parsing, by the first neural network, each of the plurality of sequential posts into one or more digital content segments;
   assigning, by the first neural network, a vector representation to each of the one or more content segments;
   calculating, by the first neural network, a total vector representation for each of the plurality of sequential posts based on the vector representations assigned to each of the one or more content segments;
  determine, using a hidden layer of the predicative engine having a second neural network, an output value relevant to probability of purchasing associated with each post in plurality of sequential posts by sequentially analyzing each post, wherein for each post in the plurality of sequential posts, each post is compared to a previously stored maximum output value, and the greater of the post and the previous stored maximum output value is newly stored as the maximum output value;
  calculate a probability of purchasing the product based on the determined output values associated with each post in the plurality of sequential posts and the stored maximum after all of the plurality of sequential posts is compared; and
  transmit product-related information to the specific user associated with the obtained posts in the plurality of sequential posts based on the determined probability of purchasing the product exceeding a specified threshold.

18. The server apparatus of claim 17, wherein the processor is configured to calculate the relevance probability for each of the obtained posts in the plurality of sequential posts by: using a feed forward neural network to calculate a relevance probability for each of the obtained posts in the plurality of sequential posts, based on content data associated with each of the obtained posts in the plurality of sequential posts individually.

19. The server apparatus of claim 17, wherein the processor is configured to determine an output value relevant to probability of purchasing the product by using a second neural network with memory to: determine a first output value associated with an obtained first post in the plurality of sequential posts based on the content of the first post; determine a second output value associated with each of the one or more subsequent posts of in the plurality of sequential posts based on the content of each of the one or more subsequent posts and the determined first output value of the obtained first post; and determine, a maximum output value based on the determined first output value associated with the obtained first post and the determined second output value associated with each of the one or more subsequent posts in the plurality of sequential posts.

20. The server apparatus of claim 19, wherein the processor is further configured to: calculate the probability of purchasing the product using a SOFTMAX function; and classify the user as being likely to purchase the product based on the calculated probability of purchasing exceeding a confidence level threshold; wherein the confidence level threshold varies based on one or more of: a number of subsequent posts obtained, calculated relevance probabilities of each of the obtained first post and the one or more subsequent posts, a desired hire purchaser strength level; a desired purchaser conversion rate and a product type.

* * * * *